Oct. 27, 1953 C. MOREY 2,656,679
ROTARY PUMP AND MOTOR HYDRAULIC TRANSMISSION SYSTEM
Filed Dec. 17, 1945 4 Sheets-Sheet 1
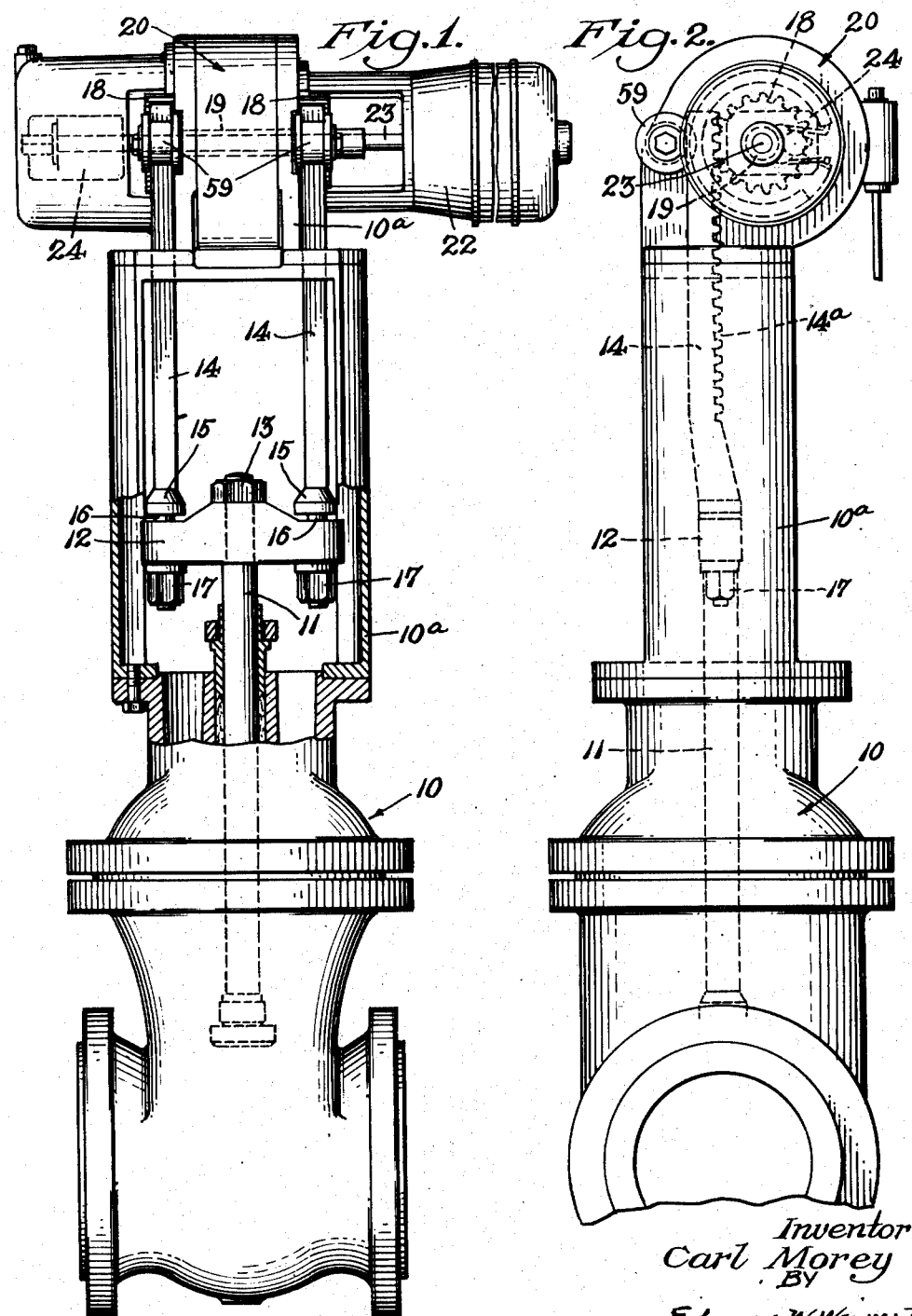
Inventor
Carl Morey
BY
Edward W. Weinert
Attorney.

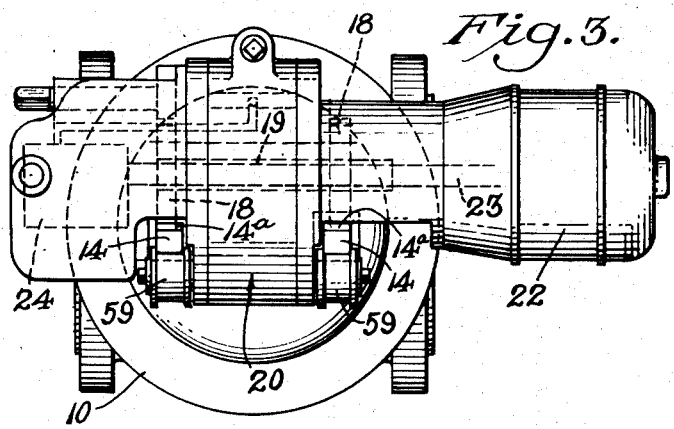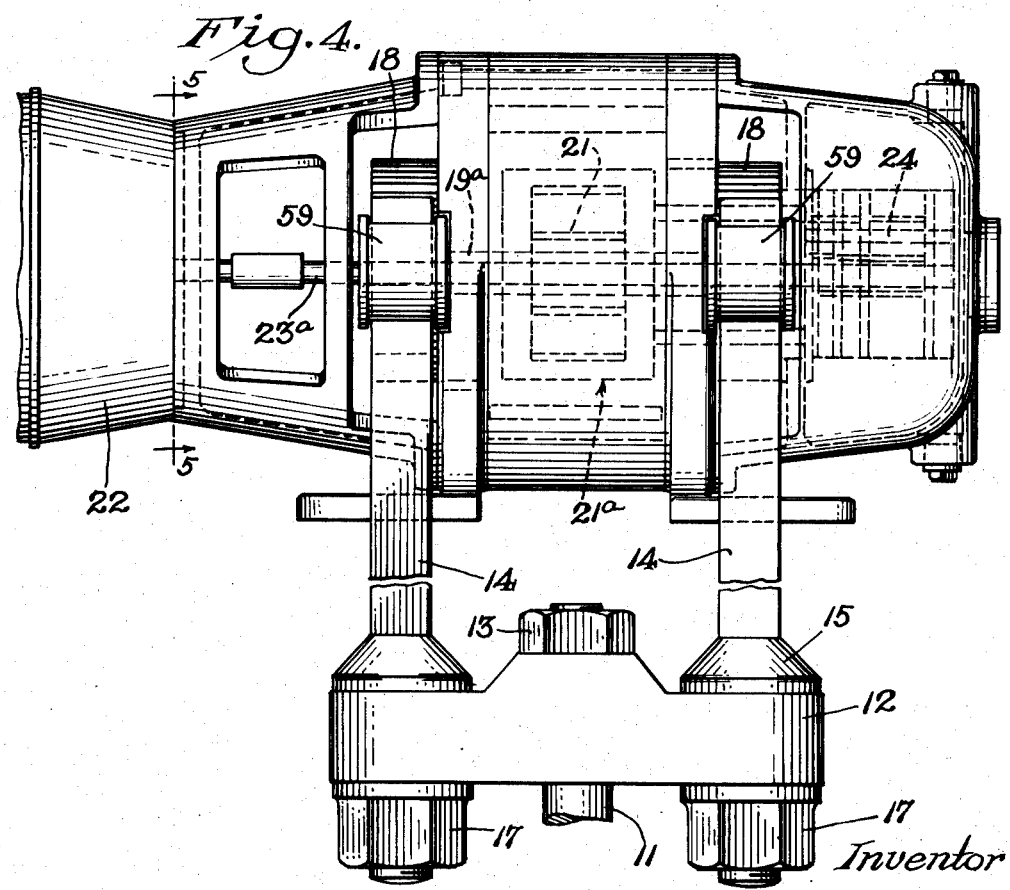

Inventor
Carl Morey
BY
Edward W. Weikert
Attorney.

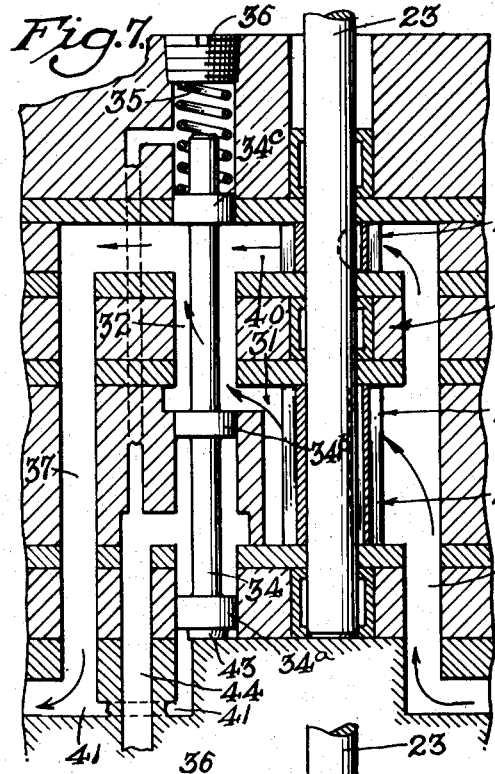
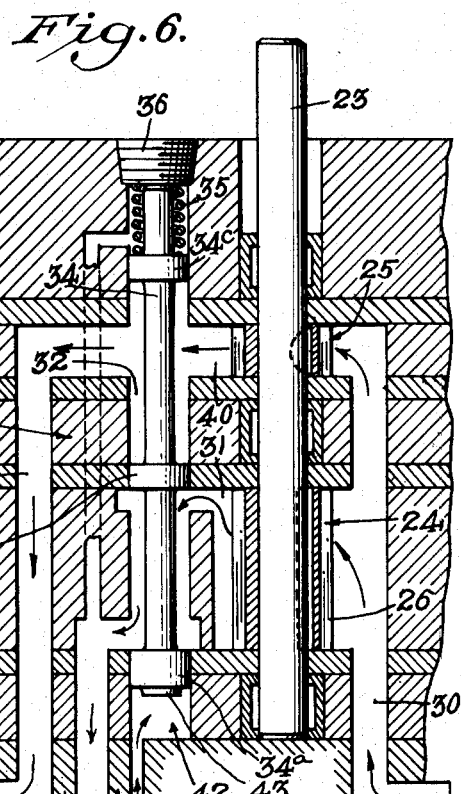
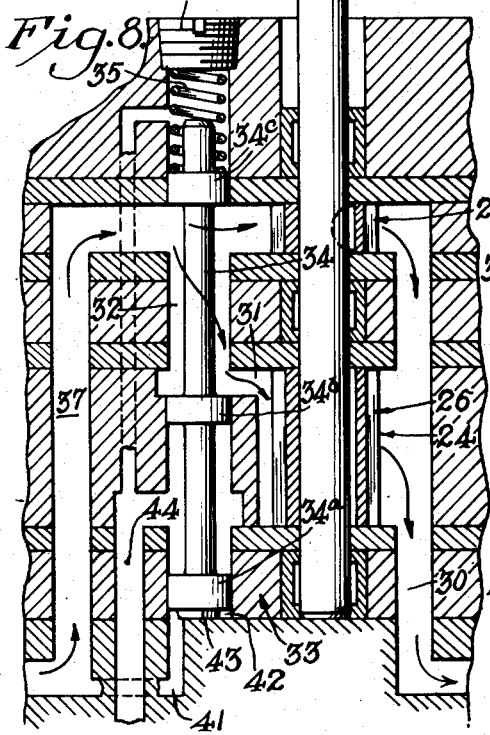

Patented Oct. 27, 1953

2,656,679

UNITED STATES PATENT OFFICE 2,656,679

ROTARY PUMP AND MOTOR HYDRAULIC TRANSMISSION SYSTEM

Carl Morey, Hamilton, Ohio, assignor to Economy Pumps, Inc., Hamilton, Ohio, a corporation of Illinois Application December 17, 1945, Serial No. 635,569

6 Claims. (Cl. 60—52)

This invention relates to a valve operating mechanism in which a fluid pressure system is used and controlled to provide a low displacement and a very high pressure for overcoming the high resistance encountered in breaking the valve loose from its seat and to provide a high displacement at low pressure for speeding up the opening of the valve after it has been removed from its seat.

According to this invention, the pressure resistance in the fluid motor which may be a paddle motor or a hydraulic motor with gears is utilized for shifting a valve for changing from low displacement and high pressure to high displacement and low pressure.

Other features and advantages of the invention will be pointed out as the description proceeds.

The invention comprises the novel structure and combination of parts hereinafter described and more particularly pointed out and defined in the appended claims.

In the accompanying drawings which illustrate a preferred form of this invention and in which similar reference numerals refer to similar features in the different views:

Fig. 1 is a side elevational view of a valve operating mechanism involving this invention;

Fig. 2 is an end elevational view of the same;

Fig. 3 is a top plan view of the mechanism;

Fig. 4 is a fragmentary side elevational view of a modified form of the invention;

Fig. 6 is an enlarged sectional view through the shift valve with parts in diagrammatic form constituting a part of this invention;

Fig. 7 is an enlarged sectional view of the shift valve showing the parts in different positions than in Fig. 6;

Fig. 8 is a view similar to Fig. 7 illustrating a part of the operation; and

Figure 5:
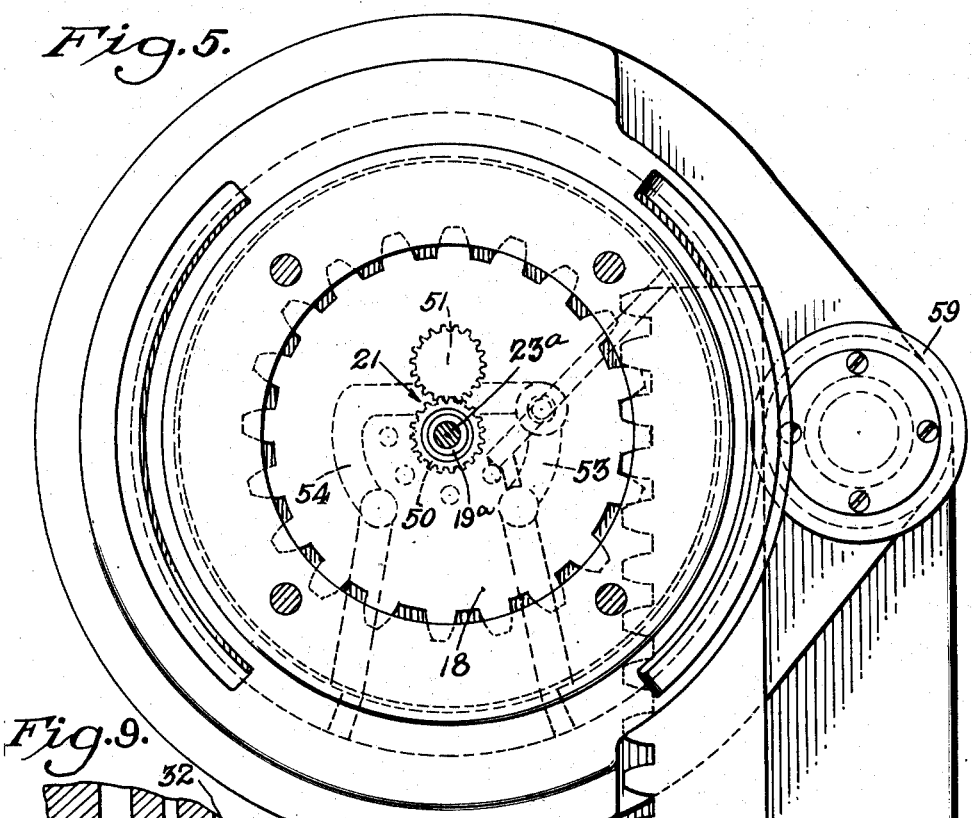
Fig. 5 is an end elevational view of the modified form of the invention, partly in section on the line 5—5 of Fig. 4.

In referring now to the drawing, which illustrates certain preferred embodiments of this invention, there is shown in Figs. 1, 2 and 3 a valve casing 10 through which a valve stem 11 extends. This valve stem may be attached at its lower end to a gate valve or any other form of valve. The invention concerns itself more particularly with the means for operating the valve stem. In the present embodiment of the invention, the valve stem is adapted for operation in the direction of its longitudinal axis, but it could easily be adapted for operation through a turning movement depending upon the type of valve to which it is attached.

Upon the upper end of the valve stem 11, there is secured a yoke 12 (Fig. 1) which abuts a nut 13 secured upon the upper end of the stem, a pair of parallel rack bars 14 are secured to the yoke 12. These rack bars are shown as having integral collars 15 above their lower ends and cylindrical portions 16 below the collars which extend through apertures in the yoke, and which are confined in the yoke by nuts 17 on the lower ends thereof. The collar 15 and nut 17 on each rack bar are preferably spaced apart slightly more than the thickness of the adjacent portions of the yoke to provide a slight lost motion. The rack bars are provided with teeth 14a upon their inner edges which are engaged by gears 18 secured upon a hollow shaft 19 which is operated by a fluid motor 20 which may be in the form of the paddle motor 20 shown more clearly in Fig. 6, or in the form of the hydraulic motor 21 shown in Figs. 4 and 9.

A reversible electric motor 22 is adapted to be attached to an upper casing 10a resting upon the lower valve casing. The shaft 23 of this motor extends freely through the hollow paddle motor shaft 19 and is connected to a suitable pump 24 mounted in the upper casing beyond the fluid motor and rack bars. The pump end of the casing provides an oil or fluid tank for supplying fluid to the pump which in turn feeds the fluid motor through a shift over valve mechanism as will presently appear.

The shift over valve mechanism and pump are shown in detail in Figs. 6, 7 and 8 and in referring to these figures, it will be noted that the pump and shift over valve have been embodied in one structure although they may be otherwise arranged. The pump consists of two sets of gears, a narrow set 25 and a wide set 26 which are mounted upon the motor shaft 23. As the horsepower of the pump is a product of the displacement by the pressure and by the constant .000583, it will be evident that for a given horsepower, the narrow set of gears will develop less volume and higher pressure than the wide set of gears. In the functioning of this mechanism, it is necessary to overcome a very high resistance to break the gate valve loose in opening the valve after it has been tightly closed and in this connection, the narrow set of gears provides a low displacement and a very high pressure for a given horsepower.

After the gate is broken loose from its seat, the power required for its subsequent travel is relatively low and the hydraulic pressure required to operate the fluid motor is consequently low. Therefore, in order to speed up the movement of the valve, the wide set of gears is introduced to operate in conjunction with the narrow set of gears obtaining thereby high displacement at low pressure. The manner in which this is accomplished will now be set forth.

In referring now to Figs. 6, 7 and 8, it will be noted that the fluid is elevated from the tank by the pump through pipes 28 and 29 which communicate with a passage 30 that leads to both sets of gears when the motor is running in one direction; when the motor is running in the opposite direction the fluid will be elevated through a pipe 27 and a pipe 38 to passage 37; the pipes 27 and 28 having suitable check valves 27a and 28a. The fluid passing through the wide gears 26 is discharged through an orifice 31 which communicates with the axial passage 32 in the shift over valve 33. A valve rod 34 in the axial passage 32 is provided with spaced valve heads 34a, 34b and 34c. A coil spring 35 which is confined in the axial passage beyond the valve head 34c by an end plug 36, bears against the valve head 34c, which closes one end of the axial passage, and normally urges the valve rod into the position shown in Fig. 7 in which position the orifice 31 communicates with the axial passage 32 above the valve head 34b. The axial passage 32 communicates with a passage 37 which is connected by a pipe 38 to the fluid motor 20 by a pipe 39.

The fluid inlet passage 30 in the pump 24 also leads to the narrow set of gears 25 which discharge the fluid through the space 40 into the axial valve passage 32 above valve head 34b from which the fluid passes into passage 37. Thus in the position of the valve as shown in Fig. 7 which is the normal position, both the wide set of gears and the narrow set of gears discharge through the shift over valve into passage 37 which leads to the fluid motor. The two sets of gears will continue to discharge fluid to the common discharge passage 37 as long as the pressure is below the amount to compress the spring 35 which holds the valve in the position shown in Fig. 7. When the resistance in the fluid motor becomes great enough to overcome spring 35 which is set for about 250 pounds hydraulic pressure, oil or fluid from passage 37 will enter passage 41 which leads to a fluid chamber 42 under valve head and shift valve 34 to the position shown in Fig. 6. It will be noted that valve head 34a has a boss 43 at its end which provides a space for entering fluid. In the position shown in Fig. 6, valve head 34b has closed communication between orifice 31 and axial passage above such head and has established communication between orifice 31 and axial chamber 32 below said head 34b. As a result, fluid will now pass from the wide set of gears in pump 24 through orifice 31 and axial passage 32 below head 34b. Below valve head 34b, axial passage 32 communicates with a discharge passage 44 that discharges into the tank.

When valve 34 is in the position shown in Fig. 6, the narrow set of gears above discharge fluid to the fluid motor and a low displacement under high pressure is obtained. Under such conditions the valve will be broken loose from its seat. As soon as the valve is broken loose from its seat, and the high resistance ceases, the pressure in passage 41 drops allowing spring 35 to return the valve to initial or normal position. Under this condition, both sets of gears of the pump will again discharge into the passage 37 and deliver a large volume of fluid or oil thereto which will cause the fluid motor to operate at high speed for opening the valve after it has been broken loose. It will be noted that pipe 38 which leads from the passage 37 is connected by pipe 39 with one side of the paddle motor for direct drive.

The fluid line 29 which also leads to the fluid motor is provided with a relief valve 45 in an offset pipe 46 discharging into the tank. Likewise, the pipe 38 which leads to the fluid motor is provided with a relief valve 45 in an offset pipe 47 discharging into the oil tank.

When the gate valve or other valve that may be attached to the stem 11 is open and it is desired to close the same, it is necessary to reverse the electric motor 22 for driving the pump in a reverse direction. When the pump 24 is driven in such reverse direction, the direction of flow of the fluid will be reversed as shown in Fig. 8 in which figure the shift over valve is shown in initial or normal position. As the pump is driven in a reverse direction, fluid will be drawn from the oil tank in the casing through pipe 27 which contains a check valve 27a and which is connected to pipe 38. From pipe 38, the fluid will pass into passage 37 and then to axial passage 32 of the valve which is now open to both the narrow set and wide set of gears. The fluid from the two sets of pump gears will now be discharged into passage 30 which is connected by pipe 29 with the other side of the fluid motor 20 for operating the same in a reverse direction for closing the gate, or other valve. During such operation, any fluid in the direct side of the fluid motor can escape through pipes 39 and 47 to the tank. It might also be mentioned that upon direct drive, any fluid in the reverse side of the fluid motor can escape through pipe 46 and valve 45 to the tank.

Figure 9:
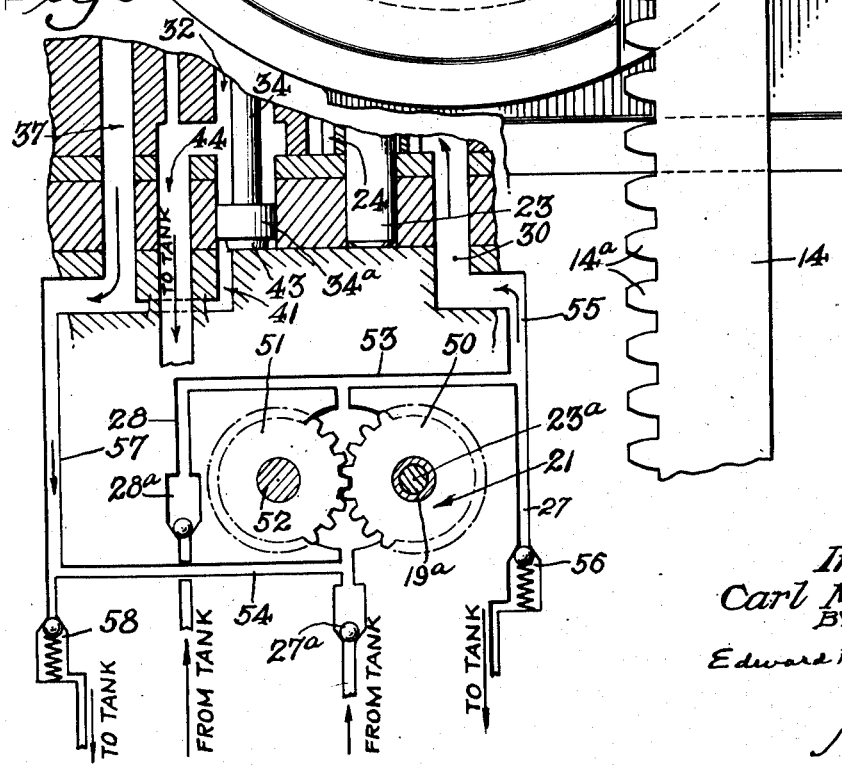
Fig. 9 is a fragmentary sectional view of the valve with a hydraulic motor according to the modified form of the invention.

The fluid motor may be of the paddle motor type shown in Fig. 6 or of the gear motor type as shown in Figs. 4, 5 and 9. When it is desired to use a gear motor, the reversible electric motor 22 may be attached to one end of the housing as shown in Fig. 4, and the shaft 23a thereof extended through the casing and attached to the pump 24 which may be positioned with its shift valve in the other end of the casing, or any other suitable arrangement may be made. The motor shaft 23a extends freely through a tubular shaft 19a which carries the rack operating gears 18. This tubular shaft in both forms may be suitably journalled in bearings to relieve pressure upon the motor shaft according to well known practice.

The hydraulic motor 21 is shown as comprising two gears 50 and 51; the gear 50 being keyed or secured to the tubular shaft 19a midway between the gears 18 and the cooperating gear 51 being mounted upon a shaft 52 journalled in the casing 21a (Fig. 4) of the hydraulic motor. Fluid is adapted to be supplied to either side of the hydraulic motor through passages or pipe connections 53 and 54 (Figs. 5 and 9).

In Fig. 9, the hydraulic motor 21 is shown diagrammatically in connection with the pump and the shift over valve. The pipe 53 is connected to a pipe 55 which extends from the passage 30 of the pump and which has a relief valve 56 at its lower end beyond the pipe 53 for discharging into the tank. The pipe 54 is shown as connected to a pipe 57 which extends from the passage 37 of the shift over valve and which has a relief valve 58 beyond pipe 54 for discharging into the tank. The pipe 53 is connected to fluid feed pipe 28 while the pipe 54 is connected to the fluid feed pipe 27. It will be understood that when pipe 53 is supplying fluid to the hydraulic motor, pipe 54 is discharging the same through check valve 58 and when pipe 54 is feeding fluid to the motor, pipe 53 discharges the same through pipe 55 and check valve 56.

In order to maintain the rack bars 14 in operative relation with the gears, guide rollers 59 have been provided which are journalled and attached to the casing adjacent the rack bars at their points of engagement with the gears 18.

In the operation of the apparatus, assume that it is desired to open the valve, the electric motor will be started in the proper direction to open the valve; the motor will drive the pump 24 which will draw oil or fluid from the tank and discharge the same through the low volume compartment or chamber where the narrow set of gears are located and also the high volume compartment or chamber where the wide set of gears function. The fluid from these two chambers will pass through the shift over valve as previously set forth and pass through duct 37 to the fluid motor. The resistance encountered in breaking the valve loose from its seat will cause pressure to build up in the fluid motor and when this pressure becomes sufficient to overcome spring 35 which holds shift over valve closed, the fluid will flow through passage 41 and enter the pressure chamber 42 under valve head 34a and elevate the valve to bring the valve head 34b above the port 31 as shown in Fig. 6 thereby shutting off the flow from the high volume chamber to the hydraulic motor and establishing a return flow to the tank through passage 44.

With the low volume chamber of the pump only feeding fluid to the hydraulic motor, there will be a low volume feed under high pressure with low displacement that will furnish the necessary power to break the valve loose from its seat. As soon as the valve is broken loose from its seat, the pressure in the feed line will drop and spring 35 will return valve rod 34 to its initial or normal position as shown in Fig. 7 in such position, both pump chambers will feed fluid to the fluid motor at increased volume, low pressure with high displacement which will speed up the elevation of the valve to full open position.

When it is desired to close the valve, the electric motor which is reversible will be rotated in the opposite direction, the flow of fluid being reversed as shown in Fig. 8 and the shift over valve will remain closed since there is now no resistance to cause the opening of the shift over valve.

It will be evident that this invention presents numerous advantages in a compact arrangement of the operating mechanism with their reversible features and wherein a greater power at a low displacement automatically comes into play to break a valve loose from its seat and wherein thereafter, a lesser power with high displacement automatically arises to open the valve after it has been broken loose.

I am aware that many changes may be made and various details of construction modified without departing from the principles of this invention so I do not propose limiting the patent granted thereon otherwise than necessitated by the appended claims.

I claim as my invention:

1. In a valve operating mechanism including a housing, a valve stem, means for operating said stem including a fluid motor having a hollow shaft in geared relation with said stem, fluid pressure means for operating said fluid motor in either direction comprising a high volume pumping unit and a low volume pumping unit axially alined, a solid shaft supporting said units and extending freely thru said hollow shaft and journalled in said housing, said housing having flow passages extending from said pumping units to both sides of said fluid motor, a spring pressed valve in said housing for controlling the flow of fluid from said high volume unit to one side of said fluid motor, said valve having communication with said one side of said fluid motor and being subject to the pressure of said fluid motor and means for rotating said pumping units in either direction.

2. In a valve operating mechanism, a longitudinally extending housing, a pump shaft journalled lengthwise in said housing, a fluid motor having a hollow shaft rotatably mounted upon an intermediate portion of said pump shaft, a valve stem geared to said hollow shaft, means for operating said fluid motor in either direction comprising fluid pressure means having a high volume pumping unit and a low volume pumping unit axially alined upon said pumping shaft beyond one end of said hollow shaft, said housing having flow passages extending from said pumping units to both sides of said fluid motor, a spring pressed valve in said housing controlling the flow of fluid from said high volume pumping unit to one side of said fluid motor, said housing having a flow passage from said valve to the flow passage from the high volume pump and means for rotating said pump shaft in either direction.

3. In a valve operating mechanism, a combined valve and pump housing, a fluid motor having a rotor adapted for clockwise and anti-clockwise rotation, a hollow shaft extending thru said rotor, said housing having a high volume pumping chamber and a low volume pumping chamber axially alined and in spaced relation to said fluid motor, a pump shaft journalled in said housing and extending freely thru said hollow shaft, pumping elements secured to said pump shaft in said pumping chambers, means for rotating said pump shaft in either direction, said housing having flow passages extending from said pumping chambers to each side of said fluid motor, said housing having a valve chamber adjacent said pumping chambers, a spring pressed valve in said valve chamber for controlling the flow from said high volume chamber under predetermined conditions, said valve being in communication with one side of said fluid motor and being subject to the pressure of said fluid motor under predetermined conditions.

4. In a valve operating mechanism, a combined valve and pump housing, a fluid motor having a rotor in said housing, means for rotating said rotor in either direction comprising a fluid pressure system including two axially alined pumping units in said housing, one of high volume capacity and the other of low volume capacity, said housing having flow passages connecting said units with both sides of said fluid motor, said housing having a valve chamber adjacent said units communicating with said fluid motor, a spring pressed valve in said valve chamber controlling the flow from said high volume unit to said fluid motor under predetermined conditions and means for rotating said pumping units in either direction.

5. In a valve operating mechanism, a valve stem, means for operating said stem comprising a fluid motor, a pump having a high volume discharge compartment and a low volume discharge compartment axially alined and having flow connections with both sides of said fluid motor, a valve for controlling the flow of fluid from said high volume compartment to said fluid motor, said valve having communication with one side of said fluid motor and being subject to the pressure in said fluid motor under predetermined conditions and reversible operating means for operating said pump in either direction.

6. In an apparatus of the class described, a reciprocable member, means for operating said member including a hollow shaft having driving connections with said member, a fluid motor on said shaft, fluid pressure means for operating said motor in either direction comprising a high volume pumping unit and a low volume pumping unit axially alined and in communication with each other, a solid shaft supporting said units and extending freely thru said hollow shaft, said apparatus having flow passages extending from said pumping units to both sides of said fluid motor, a spring pressed valve for controlling the flow of fluid from said high volume unit to one side of said fluid motor and responsive to the pressure of said fluid motor and means for rotating said pumping units in either direction.

CARL MOREY.

References Cited in the file of this patent
UNITED STATES PATENTS

| Number | Name | Date |
|---|---|---|
| 466,661 | Duncan | Jan. 5, 1892 |
| 1,318,143 | Haffner | Oct. 7, 1919 |
| 1,483,041 | Brooks | Feb. 5, 1924 |
| 1,886,518 | Beckwith | Nov. 8, 1932 |
| 1,931,791 | Dueringer | Oct. 24, 1933 |
| 1,982,711 | Vickers | Dec. 4, 1934 |
| 2,025,573 | Collingham | Dec. 24, 1935 |
| 2,074,618 | Roeder | Mar. 23, 1937 |
| 2,386,589 | Caldwell | Oct. 9, 1945 |
| 2,387,215 | Fawkes | Oct. 16, 1945 |
| 2,415,783 | Bassett | Feb. 11, 1947 |